(12) United States Patent
Al-Nakhli et al.

(10) Patent No.: US 11,976,240 B2
(45) Date of Patent: May 7, 2024

(54) METHOD FOR REMOVING CONDENSATE BANKING IN A SUBSURFACE FORMATION

(71) Applicant: Saudi Arabian Oil Company, Dhahran (SA)

(72) Inventors: Ayman R. Al-Nakhli, Dammam (SA); Bader Ghazi Alharbi, Dammam (SA); Mohammed Ali Al Yami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 17/838,699

(22) Filed: Jun. 13, 2022

(65) Prior Publication Data

US 2023/0399561 A1 Dec. 14, 2023

(51) Int. Cl.
| | |
|---|---|
| *C09K 8/592* | (2006.01) |
| *C09K 8/584* | (2006.01) |
| *C09K 8/594* | (2006.01) |
| *E21B 43/16* | (2006.01) |

(52) U.S. Cl.
CPC .............. *C09K 8/592* (2013.01); *C09K 8/584* (2013.01); *C09K 8/594* (2013.01); *E21B 43/16* (2013.01); *C09K 2208/10* (2013.01)

(58) Field of Classification Search
CPC ....................................................... E21B 43/24
See application file for complete search history.

(56) References Cited

U.S. PATENT DOCUMENTS

| 4,846,277 A | 7/1989 | Khalil et al. |
| 7,772,162 B2 | 8/2010 | Pope et al. |
| 10,851,282 B2 | 12/2020 | Janak et al. |
| 10,895,136 B2 | 1/2021 | Al-Nakhli et al. |
| 2010/0270021 A1 | 10/2010 | Baran, Jr. et al. |
| 2014/0054050 A1 | 2/2014 | Lindsay et al. |
| 2020/0095853 A1* | 3/2020 | Al-Nakhli ............... E21B 43/25 |

FOREIGN PATENT DOCUMENTS

| WO | 2015171596 A1 | 11/2015 |
| WO | 2017079386 A1 | 5/2017 |

OTHER PUBLICATIONS

Sayed et al., "Mitigation of the Effects of Condensate Banking: A Critical Review", Society of Petroleum Engineers, Production & Operation, pp. 85-102, May 2016.

* cited by examiner

*Primary Examiner* — William D Hutton, Jr.
*Assistant Examiner* — Avi T Skaist
(74) *Attorney, Agent, or Firm* — DINSMORE & SHOHL LLP

(57) ABSTRACT

A method of removing condensate banking in a subsurface formation using a treatment fluid includes injecting a treatment fluid including nanoparticles and a thermochemical component, the thermochemical component including sodium nitrite and ammonium chloride, into a wellbore having condensate banking, thereby exposing the treatment fluid to subsurface formation conditions. The method further includes allowing a temperature of the wellbore to activate the thermochemical component, causing an exothermic reaction generating nitrogen gas, pressure, and heat. The method further includes allowing the treatment fluid and generated nitrogen gas to mix with the condensate banking, thereby forming a homogenous multi-phase foam and lowering hydrostatic pressure in the wellbore. The method further includes allowing the homogenous multi-phase foam to flow back to the surface due to the pressure generated by the exothermic reaction and lowered hydrostatic pressure in the wellbore, thereby removing the condensate banking.

20 Claims, No Drawings

METHOD FOR REMOVING CONDENSATE BANKING IN A SUBSURFACE FORMATION

TECHNICAL FIELD

The present disclosure relates to methods for removing condensate banking in a subsurface formation, and more specifically, to methods for removing condensate banking in a subsurface formation using a multi-phase homogenous foam.

BACKGROUND

The discovery and extraction of hydrocarbons, such as oil or natural gas, from subsurface formations, may be impeded for a variety of reasons, such as condensate banking in the subsurface formation in an associated wellbore. Condensate banking occurs when the downhole pressure of the subsurface formation drops to less than the dew point pressure, resulting in liquid condensate forming or dropping out of the gaseous phase in the subsurface formation and the wellbore. This may lead to a decreased rate of production of hydrocarbons from the subsurface formation and the wellbore as compared to the expected rate of production. In these instances, methods for removing condensate banking in the subsurface formation can be utilized to improve hydrocarbon production.

SUMMARY

Conventional techniques include gas injection, huff-and-puff, and hydraulic fracturing or a combination thereof. The optimal application of each type depends on subsurface formation temperature, pressure, depth, net pay, permeability, residual oil and water saturations, porosity, and hydrocarbon composition. However, these methods are time-consuming and do not result in permanent condensate removal.

Generally, gas injection aims to either increase or maintain pressure in proximity of the wellbore above dew-point pressure, preventing condensate drop out from the gaseous phase. Treatment typically involves the injection of hydrocarbon gases like methane, or nonhydrocarbon gases like nitrogen or carbon dioxide, in combination with a cyclic intervention approach. Produced gases from the well itself such as methane can sometimes be recycled, reducing the logistical challenges for procurement, transportation, and on-site handling of gases. However, gas injection can sometimes be a continual process, where new gas needs to be continually injected to maintain pressure above the dew-point pressure. This can be a problem in subsurface formations where hydrocarbon gases such as methane are the desired product to be sold. In these situations, the methane cannot be recycled for injection, raising the aforementioned logistical challenges. On-site compressor units, transportation of pressurized gas trailers, and continual procurement of the previous are just a few of the many examples of logistical challenges that may be encountered.

Generally, huff-and-puff is an enhanced hydrocarbon recovery method in which a miscible gas is injected into the wellbore and subsurface formation, allowed to soak with subsurface formation fluids for a period of time, and then produced back out of the wellbore and subsurface formation. Injection of carbon dioxide gas is one potential application of huff-and-puff. Carbon dioxide gas has the ability to dissolve easily into quantities of hydrocarbons, reducing the dew-point pressure for condensate drop out. However, huff-and-puff procedures often need to be repeated about every 6 to 9 months to maintain their effectiveness, giving rise to logistical challenges associated with carbon dioxide procurement, transportation, and on-site handling, challenging the economic viability of the method. Examples of logistical challenges include those mentioned under gas injection.

Generally, hydraulic fracturing may be used to mitigate condensate banking by creating longer conductive paths between the wellbore and the subsurface formation in the form of fractures. Conductive fractures help to reduce pressure drop due to friction and tortuosity, and delay condensate dropout. However, this is only a temporary solution, as once subsurface formation pressure drops below dew point as a result of the ongoing depletion process, condensates and other formation liquids may precipitate and accumulate within the fractures, and then impede hydrocarbon production.

Therefore, gas injection, huff-and-puff, hydraulic fracturing, or a combination thereof constitute imperfect approaches to removing condensate banking. Gas injection needs to be executed on a frequent or continual basis to maintain its efficacy. Huff-and-puff raises logistical challenges associated with procurement, transportation, and on-site handling of the injected gases. Gas injection sometimes can raise the same logistical challenges. Hydraulic fracturing only delays the inevitable development of condensate banking.

Accordingly, a continuing need exists for efficient methods for reducing condensate banking in a subsurface formation that results in condensate banking removal without the logistical challenges of procurement, transportation, and on-site handling of injected gases. The methods of the present disclosure may remove condensate banking by generating nitrogen gas, pressure, and heat within the subsurface formation, leading to the creation of micro-fractures in the subsurface formation, increasing the permeability of the subsurface formation and reducing pressure drop due to friction and tortuosity. This may also reduce capillary forces present in the subsurface formation, enabling greater flowback of the condensate banking around the wellbore. The method of the present disclosure also may not raise the logistical challenges of the injected gas methods because nitrogen gas may be formed in the wellbore and subsurface formation rather than at surface. This may remove the need for on-site compressor units or pressurized gas trailers. The exothermic reaction of the method may have additional benefits in that generating nitrogen gas, pressure and heat within the subsurface formation may lead to the creation of micro-fractures in the subsurface formation, increasing the permeability of the subsurface formation and reducing pressure drop due to friction and tortuosity.

The present disclosure is generally directed to methods for removing condensate banking using a homogenous multi-phase foam while providing the aforementioned benefits.

In accordance with one embodiment of the present disclosure, a method includes injecting a treatment fluid, the treatment fluid including nanoparticles and a thermochemical component, the thermochemical component including ammonium chloride and sodium nitrite, into a wellbore having condensate banking, thereby exposing the treatment fluid to subsurface formation conditions, allowing a temperature of the wellbore to activate the thermochemical component, thereby causing an exothermic reaction generating nitrogen gas, pressure, and heat, allowing the treatment fluid and generated nitrogen gas to mix with the condensate banking, thereby forming a homogenous multi-phase foam and lowering hydrostatic pressure in the wellbore, and allowing the homogenous multi-phase foam to flow back to the surface due to the pressure generated by the exothermic reaction and lowered hydrostatic pressure in the wellbore, thereby removing the condensate banking.

Additional features and advantages of the described embodiments will be set forth in the detailed description, which follows, and in part will be readily apparent to those skilled in the art from that description or recognized by practicing the described embodiments, including the detailed description, which follows, as well as the claims.

DETAILED DESCRIPTION

Embodiments of the present disclosure are directed to methods of correcting condensate banking in a subsurface formation. In one or more embodiments, condensate banking is removed in a subsurface formation using a treatment fluid. The treatment fluid includes nanoparticles and a thermochemical component, the thermochemical component including ammonium chloride and sodium nitrite. The treatment fluid is injected into a wellbore having condensate banking, thereby exposing the treatment fluid to subsurface formation conditions. A temperature of the wellbore is then allowed to activate the thermochemical component of the treatment fluid, thereby causing an exothermic reaction that generates nitrogen gas, pressure, and heat. The treatment fluid and generated nitrogen gas are then allowed to mix with the condensate banking, thereby forming a homogenous multi-phase foam, and lowering hydrostatic pressure in the wellbore. The homogenous multi-phase foam is then allowed to flow back to the surface due to the pressured generated by the exothermic reaction and lowered hydrostatic pressure in the wellbore, thereby removing the condensate banking.

As used throughout this disclosure, the term "condensate" refers to a liquid hydrocarbon phase that generally occurs in association with natural gas. The condensate's presence as a liquid phase depends on temperature and pressure conditions in the subsurface formation allowing condensation of liquid from vapor. The American Petroleum Institute (API) gravity of condensate is typically from 50° to 120°.

As used throughout this disclosure, the term "condensate banking" refers to a relative permeability effect where condensate drops out of the vapor phase around the wellbore when the pressure drops to less than the dew point in response to drawdown or depletion. Gas production rate may be severely reduced by the permeability reduction. As used herein, "condensate banking" may also refer to the components of the condensate banking, rather than its effect.

The term "dew point" refers to the pressure at which the first liquid comes out of a gas solution.

As used throughout this disclosure, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, the present disclosure is directed to methods of correcting condensate banking in a subsurface formation using a treatment fluid. Methods for correcting condensate banking in a subsurface formation include a treatment fluid. The treatment fluid includes nanoparticles and a thermochemical component, where the thermochemical component includes ammonium chloride and sodium nitrite.

As previously mentioned, the treatment fluid includes nanoparticles. The nanoparticles may include silicon dioxide nanoparticles. In embodiments, the silicon dioxide nanoparticles may be suspended in a sodium hydroxide solution. The treatment fluid may include from 0 to 0.5 vol. %, from 0 to 0.4 vol. %, from 0 to 0.3 vol. %, from 0 to 0.2 vol. %, from 0 to 0.1 vol. %, from 0.1 to 0.5 vol. %, from 0.1 to 0.4 vol. %, from 0.1 to 0.3 vol. %, from 0.1 to 0.2 vol. %, from 0.2 to 0.5 vol. %, from 0.2 to 0.4 vol. %, from 0.2 to 0.3 vol. %, from 0.3 to 0.5 vol. %, from 0.3 to 0.4 vol. %, or from 0.4 to 0.5 vol. % nanoparticles as calculated by volume of the treatment fluid.

As previously mentioned, the treatment fluid includes a thermochemical component. The thermochemical component may include a nitrite-containing compound and an ammonium-containing compound. The ammonium-containing compound may include ammonium chloride, ammonium bromide, ammonium nitrate, ammonium sulfate, ammonium carbonate, ammonium hydroxide, or combinations thereof. In embodiments, the nitrite-containing compound may include sodium nitrite, potassium nitrite, or combinations thereof. In embodiments, the thermochemical component may include sodium nitrite and ammonium chloride. The treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % of the thermochemical component as calculated by volume of the treatment fluid.

As previously mentioned, the thermochemical component includes sodium nitrite. In embodiments, the treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % sodium nitrite as calculated by volume of the thermochemical component.

As previously mentioned, the thermochemical component includes ammonium nitrate. In embodiments, the treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % ammonium chloride as calculated by volume of the thermochemical component.

In embodiments, at least one salt hydrate may be substituted for either the ammonium-containing compound or the nitrite-containing compound. The salt hydrates that substitute for the ammonium-containing compound may include $MgCl_2 \cdot 6H_2O$, $CaCl_2 \cdot 2H_2O$, or both. The salt hydrates that substitute for the nitrite-containing compound may include $MgSO_4 \cdot 7H_2O$, $Al_2SO_4 \cdot 8H_2O$, or both. The thermochemical component may further include at least one acid salt, the acid salt being acidic after being dissolved in a solvent. The acid salt may include $NaHCO_3$, $NaHSO_4$, $NaH_2PO_4$, $Na_2HPO_4$, or combinations thereof.

In embodiments, the treatment fluid may further include a foaming agent. As described herein, a "foaming agent" refers to an additive that entrains gas within a fluid, creating a foam solution with a lowered density than before the gas was entrained. The foaming agent may include quaternary organosilane, didecyldimethylammonium chloride, a cocamine oxide surfactant, an alkyl imidazoline surfactant, poly[dimethylsiloxane-co-[3-(2-(2-hydroxyethoxy)ethoxy) propyl]methylsiloxane], or combinations thereof. The treatment fluid may include from 0.1 to 5 vol. %, from 0.1 to 4 vol. %, from 0.1 to 3 vol. %, from 0.1 to 2 vol. %, from 0.1 to 1 vol. %, from 1 to 5 vol. %, from 1 to 4 vol. %, from 1 to 3 vol. %, from 1 to 2 vol. %, from 2 to 5 vol. %, from 2 to 4 vol. %, from 2 to 3 vol. %, from 3 to 5 vol. %, from 3 to 4 vol. %, or from 4 to 5 vol. % foaming agent as calculated by volume of the treatment fluid.

In embodiments, the treatment fluid may further include an emulsifier. As described herein, an "emulsifier" refers to an additive that creates an emulsion, a dispersion of one immiscible liquid into another, by reducing the interfacial tension between two liquids to achieve stability. The emulsifier may create the emulsion by lowering the interfacial tension between the condensates and the water, resulting in the emulsification of the condensates and water. For example, the addition of an emulsifier may cause condensate to be dispersed into water. In another example, the addition of an emulsifier may cause water to be dispersed into condensate. In embodiments, the emulsifier may include salts of carboxylic acids, products of acylation reactions between carboxylic acids and amines, products of acylation reactions between carboxylic anhydrides and amines, alkylsaccharides, or combinations thereof. In embodiments, the emulsifier may include palmitic acid. The treatment fluid may include from 0.1 to 5 vol. %, from 0.1 to 4 vol. %, from 0.1 to 3 vol. %, from 0.1 to 2 vol. %, from 0.1 to 1 vol. %, from 1 to 5 vol. %, from 1 to 4 vol. %, from 1 to 3 vol. %, from 1 to 2 vol. %, from 2 to 5 vol. %, from 2 to 4 vol. %, from 2 to 3 vol. %, from 3 to 5 vol. %, from 3 to 4 vol. %, or from 4 to 5 vol. % emulsifier as calculated by volume of the treatment fluid.

In embodiments, the treatment fluid may further include a buffer. As used in the present disclosure, a "buffer" refers to an acid, a base, or a salt that tends to cause a solution to maintain a constant pH. The buffer may include acetic acid, citric acid, monopotassium phosphate, N-cyclohexyl-2-aminoethanesulfonic acid, or combinations thereof. The treatment fluid may include from 10 to 40 vol. %, from 10 to 35 vol. %, from 10 to 30 vol. %, from 10 to 25 vol. %, from 15 to 40 vol. %, from 15 to 35 vol. %, from 15 to 30 vol. %, from 15 to 25 vol. %, from 20 to 40 vol. %, from 20 to 35 vol. %, from 20 to 25 vol. %, from 23 to 40 vol. %, from 23 to 35 vol. %, from 23 to 30 vol. %, from 23 to 25 vol. %, or approximately 24 vol. % buffer by volume of the treatment fluid.

In embodiments, the treatment fluid may further include a surfactant. The surfactant may include sodium laureth sulfate, cetyl trimethylammonium bromide, or both. A surfactant is an additive that preferentially adsorbs at an interface, lowering the surface tension or interfacial tension between two substances. The surfactant may adsorb on a surface of the subsurface formation, thereby reducing the surface tension or interfacial tension between the subsurface formation and the condensate. In embodiments, the surfactant may increase the amount of the treatment fluid that may be flowed back or otherwise recovered from the subsurface formation by the previous process. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % surfactant as calculated by volume of the treatment fluid. The treatment fluid may include a corrosion inhibitor. The corrosion inhibitor may include amidoamines, quaternary amines, amides, phosphate esters, or combinations thereof. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % corrosion inhibitor as calculated by volume of the treatment fluid.

In embodiments, the treatment fluid may include a scavenger. The scavenger may include a hydrogen scavenger, a hydrogen sulfide scavenger, or both. Hydrogen scavengers may include glyoxal or bis(hydroxyalkyl)hydantoins. Hydrogen sulfide scavengers may include but are not limited to oxidants such as inorganic peroxides such as sodium peroxide, or chlorine dioxide, aldehydes or dialdehydes, such as $C_1$-$C_{10}$ aldehydes, formaldehyde, glutaraldehyde, ((meth)acrolein or glyocxal), triazines such as monoethanol amine triazine, and monomethylamine triazine and hydantoins such as hydroxyalkylhydantoins, bis(hydroxyalkyl) hydantoins and dialkylhydantoins where the alkyl group is a $C_1$-$C_6$ alkyl group. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % scavenger as calculated by volume of the treatment fluid.

As previously stated, embodiments of the present disclosure include methods of removing condensate banking in a subsurface formation using a treatment fluid. The treatment fluid may be any of the treatment fluids previously described.

In embodiments, the treatment fluid may be mixed at a surface of a wellbore. The treatment fluid may be mixed using any mechanical means, including but not limited to agitation, blending, or stirring.

Following the mixing, the treatment fluid may be injected into a wellbore having condensate banking, thereby exposing the treatment fluid to subsurface formation conditions. The treatment fluid may be injected by surface equipment, such as pumps, creating a differential pressure between the surface and the wellbore. As described herein, "subsurface formation conditions" include, but are not limited to, pH, temperature, pressure, and salinity. In embodiments, the condensate banking may include at least condensate and hydrocarbon gas. In embodiments, the condensate banking may further include an aqueous component. The aqueous component may include at least one of fresh water, salt water, brine, municipal water, formation water, produced water, well water, filtered water, distilled water, sea water, or combinations thereof. The brine may include at least one of natural and synthetic brine, such as saturated brine or formate brine.

In embodiments, injecting the treatment fluid into the wellbore may include injecting the treatment fluid through coiled tubing, production tubing, an annulus of the wellbore, or combinations thereof within the wellbore. The coiled tubing, production tubing, annulus of the wellbore, or combinations thereof may lead from the surface to the condensate banking.

After the treatment fluid has been injected into the wellbore, the treatment fluid may be activated by the subsurface formation conditions to which the treatment fluid has been exposed. In embodiments, the temperature of to the subsurface formation may activate the thermochemical component, causing an exothermic reaction. The exothermic reaction generates nitrogen gas, pressure, and heat within the subsurface formation. The exothermic reaction generating nitrogen gas, pressure and heat within the subsurface formation may also lead to the creation of micro fractures in the subsurface formation, increasing the permeability of the subsurface formation.

In embodiments, the temperature of the wellbore may activate the thermochemical component by raising the temperature of the thermochemical component to a pH determinative reaction activation temperature. For example, and in embodiments, when the pH of the treatment fluid is at 6 pH, the reaction activation temperature of the thermochemical component may be approximately 125° F. In another example, when the pH of the treatment fluid is at 7 pH, the reaction activation temperature of the thermochemical component may be approximately 137° F. In another example, when the pH of the treatment fluid is at 8 pH, the reaction activation temperature of the thermochemical component may be approximately 150° F. In another example, when the pH of the treatment fluid is at 9 pH, the reaction activation temperature of the thermochemical component may be approximately 187° F. In another example, when the pH of the treatment fluid is at 10 pH, the reaction activation temperature of the thermochemical component may be approximately 325° F. In embodiments, lower pH's of the treatment may require lower reaction activation temperatures for the thermochemical component, and vice versa.

As mentioned, the exothermic reaction may generate nitrogen gas, pressure, and heat. The basic reaction that controls the generation of nitrogen gas, pressure, and heat is:

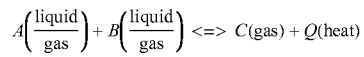

$$A\left(\frac{\text{liquid}}{\text{gas}}\right) + B\left(\frac{\text{liquid}}{\text{gas}}\right) \Longleftrightarrow C(\text{gas}) + Q(\text{heat})$$

In embodiments, the thermochemical component may include ammonium chloride and sodium nitrite. Ammonium chloride and sodium nitrite may make up the first and second reactants of the previously discussed basic reaction. In this specific embodiment, the reaction that controls the generation of nitrogen gas, pressure, and heat is:

$$NH_4Cl + NaNO_2 \rightarrow N_2(g) + NaCl + 2H_2O + \text{Heat}$$

As previously disclosed, in embodiments, the ammonium-containing compound may be substituted by hydrate salts including $MgCl_2 \cdot 6H_2O$, $CaCl_2 \cdot 2H_2O$, or both. The immediately previous hydrate salts may react with the nitrite-containing compound in a similar manner as the ammonium-containing compound in the above reaction and as previously described. As previously disclosed, in embodiments, the nitrite-containing compound may be substituted by hydrate salts including $MgSO_4 \cdot 7H_2O$, $Al_2SO_4 \cdot 8H_2O$, or both. The immediately previous hydrate salts may react with the ammonium-containing compound in a similar manner as the nitrite-containing compound in the above reaction and as previously described.

Referring again to the basic reaction, and in previous embodiments, the reaction products created by the exothermic reaction, nitrogen gas, pressure, and heat, increase the temperature and pressure within the wellbore and subsurface formation. This may result in tensile fractures when the pressure exceeds the subsurface formation breakdown pressure and thermal fractures when the temperature exceeds a subsurface formation breakdown temperature. The pressure threshold at which new fractures form in the subsurface formation is the subsurface formation breakdown pressure. The temperature threshold at which new fractures form in the subsurface formation is the subsurface formation breakdown temperature.

The method then includes allowing the treatment fluid and nitrogen gas to mix with the condensate banking, thereby forming a homogenous multi-phase foam. The formation of the homogenous multi-phase foam lowers hydrostatic pressure in the wellbore. In embodiments, the mixing of the treatment fluid, nitrogen gas, and condensate banking may form a homogenous multi-phase foam by the foaming agent entraining nitrogen gas within the condensate. In other embodiments, the mixing of the treatment fluid, nitrogen gas, and condensate banking may form a homogenous multi-phase foam by the emulsifier creating an emulsion between the condensate and the aqueous component and the foaming agent entraining nitrogen gas within either a condensate-aqueous component emulsion or an aqueous component-condensate emulsion.

In embodiments, the homogenous multi-phase foam may have a gas phase and a condensate phase. The gas phase may include hydrocarbon gas and nitrogen gas. In embodiments, the multi-phase foam may further include a liquid phase. The liquid phase may include condensate and the aqueous component.

The method further includes the step of allowing the homogenous multi-phase foam to flow back to the surface. The homogenous multi-phase foam may flow back to the surface due to the pressure generated by the exothermic reaction, the lowered hydrostatic pressure in the wellbore, or both. Allowing the homogenous multi-phase foam to flow back to the surface may thereby remove the condensate banking. The generated pressure, the lowered hydrostatic pressure in the wellbore, or both may flow the homogenous multi-phase foam to surface by creating a positive pressure differential between the subsurface formation and the surface of the wellbore.

In embodiments, allowing the homogenous multi-phase foam to flow back to the surface may include allowing the homogenous multi-phase foam to flow back to the surface along the interior of coiled tubing, production tubing, the annulus of the wellbore, or combinations thereof within the wellbore and leading from the surface to the condensate banking.

In embodiments where the treatment fluid includes a buffer solution, it is contemplated that the buffer solution may delay the exothermic reaction until the thermochemical component is exposed to subsurface formation conditions.

EXAMPLES

The following examples illustrate features of the present disclosure but are not intended to limit the scope of the disclosure.

Example 1

Two cylindrical columns were filled with a volume of an aqueous component and condensate. As described previously, an "aqueous component" may include at least one of fresh water, salt water, brine, municipal water, formation water, produced water, well water, filtered water, distilled water, sea water, or combinations thereof. Also as described previously, "brine" may include at least one of natural and synthetic brine, such as saturated brine or formate brine. Also as described previously, "condensate" may refer to a liquid hydrocarbon phase that generally occurs in association with natural gas. The condensate's presence as a liquid phase depends on temperature and pressure conditions in the subsurface formation allowing condensation of liquid from vapor. The API gravity of condensate is typically from 50° to 120°. The examples were conducted at room temperature, 68 to 72 degrees Fahrenheit (° F.), and atmospheric pressure, 14.7 psi. Each of the cylindrical columns was open to the atmosphere at the top of the cylindrical column. A gas valve was present at the bottom of each cylindrical column, the gas valve operable when opened to inject gas into the cylindrical columns through a gas inlet line. Each of the examples was exposed to nitrogen gas through the gas valve and gas inlet line.

The first cylindrical column was filled with 100 mL of fresh water as the aqueous component and 100 mL of 46 degree API gravity hydrocarbon condensate. The column was then subjected to nitrogen gas injection from the gas inlet line. No removal of condensate or aqueous component was observed, and at atmospheric conditions nitrogen gas did not flow out of the cylinder.

The second cylindrical column was filled with 100 mL of the fresh water as the aqueous component, 100 mL of 46 degree API gravity hydrocarbon condensate, 4 mL of Poly [dimethylsiloxane-co-[3-(2-(2-hydroxyethoxy)ethoxy)propyl] methylsiloxane] as foaming agent, 0.1 grams of colloidal silica nanoparticles, and 4 mL of palmitic acid as the emulsifier. The contents of the column were then mixed together. The column was then subjected to nitrogen gas injection from the gas inlet line. A homogenous multi-phase foam of the column contents was observed to be formed at this time, resulting in partial removal of the condensate and aqueous component. Additional nitrogen gas injection resulted in complete removal of the condensate and water from the column in the form of foam.

Example 2

A treatment fluid, according to one or more embodiments herein, was mixed with a volume of aqueous component and condensate in a graduated cylinder, activated, and visually analyzed. The example was conducted at room temperature and atmospheric pressure. Preparation for mixing involved filling the graduated cylinder with 100 mL of the fresh water as the aqueous component, 100 mL of 46 degree API gravity hydrocarbon condensate, 50 mL of 3 molar sodium nitrite, 50 mL of 3 molar ammonium chloride, 4 mL of Poly [dimethylsiloxane-co-[3-(2-(2-hydroxyethoxy)ethoxy)propyl] methylsiloxane] as foaming agent, 0.1 grams of colloidal silica nanoparticles, and 4 mL of palmitic acid as emulsifier. The contents of the graduated cylinder were then mixed together. The thermochemical component, including the sodium nitrite and ammonium chloride, was then activated by increased temperature. Activation generated a homogenous multi-phase foam of the aqueous component, the condensate, and the nitrogen generated from the activation of the thermochemical component. Activation also resulted in a significant volumetric expansion of the contents of the graduated cylinder.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of removing condensate banking in a subsurface formation comprises:
   injecting a treatment fluid into a wellbore having condensate banking, thereby exposing the treatment fluid to subsurface formation conditions, wherein the treatment fluid comprises nanoparticles and a thermochemical component, the thermochemical component comprising ammonium chloride and sodium nitrite;

activating the thermochemical component with the temperature of the wellbore, thereby causing an exothermic reaction generating nitrogen gas, pressure, and heat;

mixing the treatment fluid and generated nitrogen gas with the condensate banking, thereby forming a homogenous multi-phase foam and lowering hydrostatic pressure in the wellbore; and flowing the homogenous multi-phase foam back to the surface due to the pressure generated by the exothermic reaction and lowered hydrostatic pressure in the wellbore, thereby removing the condensate banking.

2. The method of claim 1:
further comprising mixing the treatment fluid at a surface of the wellbore; and
wherein injecting the treatment fluid into the wellbore comprises injecting the treatment fluid into the wellbore through coiled tubing, production tubing, an annulus of the wellbore, or combinations thereof.

3. The method of claim 1, wherein flowing the homogeneous multi-phase foam back to the surface comprises flowing the homogenous multi-phase foam back to the surface through coiled tubing, production tubing, the annulus of the wellbore, or combinations thereof.

4. The method of claim 1, wherein the treatment fluid comprises from 30 to 70 vol. % ammonium chloride as calculated by volume of the treatment fluid.

5. The method of claim 1, wherein the treatment fluid comprises from 30 to 70 vol. % sodium nitrite as calculated by volume of the treatment fluid.

6. The method of claim 1, wherein the treatment fluid further comprises a foaming agent, the foaming agent comprising a quaternary organosilane, didecyldimethylammonium chloride, a cocamine oxide surfactant, an alkyl imidazoline surfactant, poly[dimethylsiloxane-co-[3-(2-(2-hydroxyethoxy)ethoxy)propyl]methylsiloxane], or combinations thereof.

7. The method of claim 6, wherein the treatment fluid comprises from 0.1 to 5 vol. % foaming agent as calculated by volume of the treatment fluid.

8. The method of claim 1, wherein:
the treatment fluid further comprises an emulsifier, and
the emulsifier comprises salts of carboxylic acids; products of acylation reactions between carboxylic acids and amines; products of acylation reactions between carboxylic anhydrides and amines; alkyl-saccharides; or combinations thereof.

9. The method of claim 8, wherein the treatment fluid comprises from 0.1 to 5 vol. % emulsifier as calculated by volume of the treatment fluid.

10. The method of claim 1, wherein the nanoparticles comprise silicon dioxide nanoparticles.

11. The method of claim 10, wherein the treatment fluid comprises from 0.1 to 0.5 vol. % silicon dioxide nanoparticles as calculated by volume of the treatment fluid.

12. The method of claim 1, wherein the treatment fluid further comprises a buffer comprising acetic acid, citric acid, monopotassium phosphate, or N-cyclohexyl-2-aminoethanesulfonic acid.

13. The method of claim 12, wherein the treatment fluid comprises from 0.1 to 20 vol. %, buffer as calculated by volume of the treatment fluid.

14. The method of claim 1, wherein the condensate banking comprises at least condensate and hydrocarbon gas.

15. The method of claim 14, wherein the homogenous multi-phase foam has a gas phase and a condensate phase, and wherein the gas phase comprises hydrocarbon gas and nitrogen gas.

16. The method of claim 15, wherein the condensate banking further comprises an aqueous component.

17. The method of claim 16, wherein the homogenous multi-phase foam further comprises a liquid phase comprising condensate and the aqueous component.

18. The method of claim 1, wherein
the thermochemical component may further comprise a salt hydrate and an acid salt;
the salt hydrate comprises $MgCl_2 \cdot 6H_2O$, $CaCl_2 \cdot 2H_2O$, or both; and
the acid salt comprises $NaHCO_3$, $NaHSO_4$, $NaH_2PO_4$, $Na_2HPO_4$, or combinations thereof.

19. The method of claim 1, wherein the treatment fluid comprises:
the nanoparticles, comprising silicon dioxide nanoparticles;
the thermochemical component;
a buffer comprising acetic acid;
a foaming agent comprising poly[dimethylsiloxane-co-[3-(2-(2-hydroxyethoxy)ethoxy)propyl]methylsiloxane]; and
an emulsifier comprising alkyl-saccharides.

20. The method of claim 19, wherein the treatment fluid comprises:
from 0.1 to 0.5 vol. % nanoparticles;
from 30 to 70 vol. % thermochemical component;
from 0.1 to 20 vol. % buffer;
from 0.1 to 0.5 vol. % foaming agent; and
from 0.1 to 0.5 vol. % emulsifier, and wherein the vol. % is calculated by volume of the treatment fluid.

* * * * *